United States Patent [19]

Reichenbach

[11] 4,096,901
[45] Jun. 27, 1978

[54] TIRE PLUG FOR TUBELESS TIRES

[76] Inventor: William Reichenbach, 238 Java St., Brooklyn, N.Y. 11222

[21] Appl. No.: 747,740

[22] Filed: Dec. 6, 1976

Related U.S. Application Data

[63] Continuation-in-part of Ser. No. 634,586, Nov. 24, 1975, abandoned.

[51] Int. Cl.² ............................................. B60C 21/00
[52] U.S. Cl. ........................................ 152/370; 85/61
[58] Field of Search ............... 152/368, 370, 210, 211; 156/96, 97; 85/61; 81/15, 7

[56] References Cited

U.S. PATENT DOCUMENTS

| 570,942 | 11/1896 | Merritt | 152/370 |
|---|---|---|---|
| 2,292,557 | 8/1942 | Wilson | 85/61 |
| 2,727,554 | 12/1955 | Westfall | 152/370 |
| 3,174,524 | 3/1965 | Nitzche | 152/370 |

Primary Examiner—Stanley H. Tollberg
Assistant Examiner—H. Grant Skaggs
Attorney, Agent, or Firm—McAulay, Fields, Fisher & Goldstein

[57] ABSTRACT

A tire plug for a tubeless tire is disclosed which provides for a fracturable finger gripping portion and a tapered threaded portion for manual insertion of the plug into the puncture of the tire. The tapered portion exerts an increasingly compressive force on the tire wall of the puncture upon threaded insertion of the plug to seal the puncture, and the finger gripping portion is severed from the plug after the puncture has been sealed.

10 Claims, 5 Drawing Figures

TIRE PLUG FOR TUBELESS TIRES

CROSS REFERENCE TO RELATED APPLICATION

This application is a continuation-in-part of applicant's co-pending application Ser. No. 634,586, filed Nov. 24, 1975 and now abandoned.

FIELD OF THE INVENTION

This invention relates generally to tire plugs and, more particularly, to a tire plug which is threadedly inserted into the puncture of a tubeless tire. The plug has a tapered portion for exerting an increasingly compressive force on the tire material of the wall defining the puncture to seal said puncture upon threaded insertion of the plug.

DESCRIPTION OF THE PRIOR ART

Heretofore, it has been proposed to provide a plug type repair kit for pneumatic tubeless tires consisting of a rubber sealing member which is inserted into the puncture and which is vulcanized in place by the running temperature of the tire. Examples of such tire repair plugs are disclosed in U.S. Pat. Nos. 2,966,189; 3,174,524 and 3,308,867.

The plugs respectively disclosed in the above patents each require the use of a suitable tool for pushing the plug through the puncture in the tire casing from a point either inside or outside the casing. The plug stretches upon insertion which reduces its cross section. Then, upon withdrawal of the tool, the plug expands into contact with the tire material of the wall defining the puncture. In some applications, the plug is formed having helical threads which grip the cords of the tire to effect the sealing operation. In each instance, a coating of rubber cement is applied to the tire wall surrounding the puncture and/or to the repair plug whereupon the plug is intended to bond or vulcanize to the cured rubber of the tire casing merely upon the development of road heat in the repaired tire. After insertion of the plug, the protruding portion of the body is clipped off a short distance from the tire.

Still another type of repair plug is disclosed in U.S. Pat. No. 3,296,048. The plug of this patent is constructed of rubber-like material having a helical thread extending from its tip end all the way to a gripping portion at its opposite end. The gripping portion is adapted to accommodate a wrench for threadedly inserting the plug into the puncture. Aside from the tapered tip end, the main body portion is cylindrical having a constant cross section. In use, the plug is first cooled to a temperature less than 0° F. whereupon it is then screwed by a wrench, while still frozen, through the hole in the tire. A lubricating cement is used to facilitate threaded insertion of the plug and also to provide air sealing between the hole and the repair element. The head end of the frozen repair element is cut off smooth with the surface of the tire with a knife or hacksaw.

It is to be noted that a special tool is required to insert each of the above disclosed plugs into the tire. In addition, a rubber cement is applied to the plug and/or puncture of the tire whereupon the plug is intended to vulcanize to the tire casing upon the application of heat. In one instance, the plug is frozen prior to insertion into the tire which invariably requires that the repair be made by a specialized shop having trained technicians and special equipment. The present invention eliminates the need for special tools or cement in inserting the plug, and effects sealing of the puncture solely by the application of a compressive force on the tire wall surrounding the puncture.

SUMMARY OF THE INVENTION

The tire plug of the present invention discloses, for the most part, a plug previously disclosed in applicant's copending application Ser. No. 634,586. The plug comprises a rigid body member having a plurality of integrally formed portions extending longitudinally of the member. These portions include a pointed entrant portion at one end of the body member and a severable finger gripping portion at the opposite end. A tapered threaded portion is located between the entrant portion and the finger gripping portion, and a fracturable stem portion is provided for connecting the finger gripping portion to the tapered threaded portion. The diameter of the tapered threaded portion increases in the direction of the finger gripping portion for exerting an increasingly compressive force on the tire material of the wall defining the puncture to seal the puncture upon threaded insertion of the plug. The structure permits the stem portion to fracture in response to a predetermined force whereby the finger gripping portion is severed from the body member after the puncture has been sealed.

In other embodiments of the invention, the body member may be formed having a tapered collar portion located immediately below the tapered threaded portion. The collar portion defines a conical seat which is disposed in contact with the inner plies of the tire casing surrounding the puncture for exerting a compressive force on said plies to seal the puncture. A spherically shaped portion may also be provided immediately below the tapered collar portion. The spherically shaped portion is sized to be forcibly passed through the puncture by compressing the resilient tire wall defining said puncture, whereupon the tire wall expands to lock the plug within the casing of the tire. An additional non-tapered threaded portion may be further provided between the spherically shaped portion and the pointed extrant portion to facilitate threaded insertion of the plug into the tire.

Accordingly, it is an object of the present invention to provide a novel tire plug for tubeless tires which has a fracturable finger gripping portion and a tapered threaded portion for manual insertion of the plug into the puncture of the tire. The tapered portion exerts an increasingly compressive force on the tire wall of the puncture upon threaded insertion of the plug to seal said puncture, and the finger gripping portion is severed from the plug after the puncture has been sealed.

Another object of the present invention is to provide a novel tire plug which is threadedly inserted into the puncture of a tubeless tire without the use of special tools or rubber bonding cement, and which plug seals the puncture without requiring the application of heat.

The above brief description of the invention and other objects, features and advantages of the said invention will become more apparent from a consideration of the following detailed description when taken in conjunction with the accompanying drawings.

DESCRIPTION OF THE PREFERRED EMBODIMENTS

Figure 1:
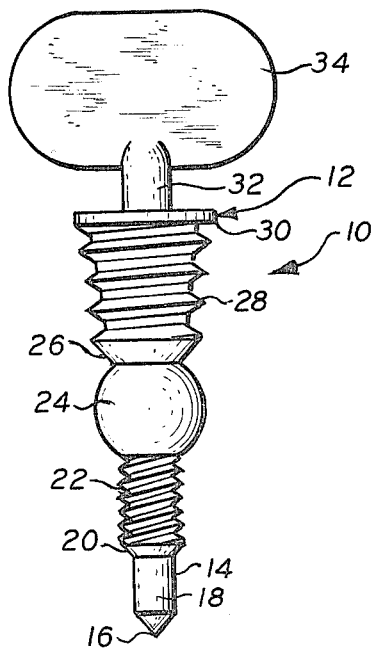
FIG. 1 is a side elevational view of the tire plug constructed in accordance with the present invention.
Figure 2:
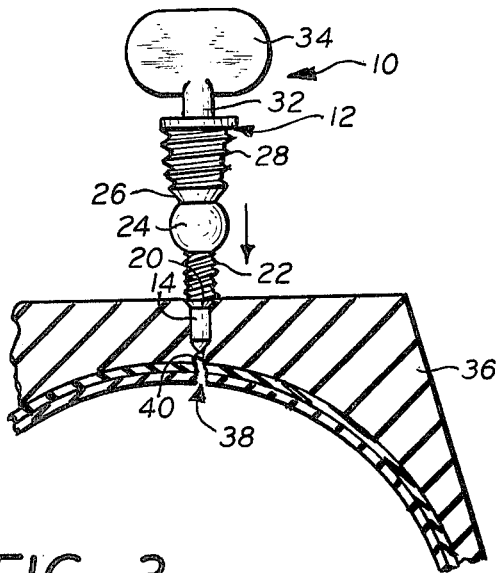
FIG. 2 is a partial cross sectional view of a tubeless tire showing the repair plug of FIG. 1 being initially inserted into the puncture of the tire.
Figure 3:
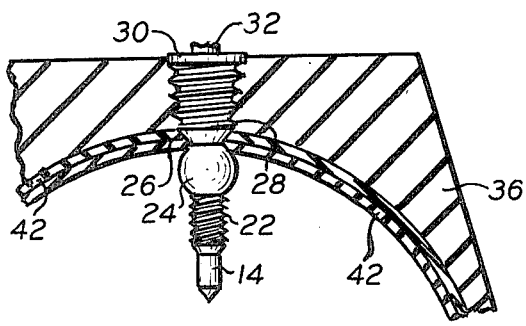
FIG. 3 is a view similar to that of FIG. 2 showing the repair plug fully inserted to seal the puncture of the tire, and with the finger gripping portion severed from the body member of the plug.

Referring to the drawings, particularly FIGS. 1, 2 and 3, numeral 10 represents one embodiment of the novel tire plug constructed in accordance with the present invention. This embodiment corresponds to the tire plug disclosed in applicant's co-pending application Ser. No. 634,596. Plug 10 comprises a rigid body member 12 formed of ABS plastic (acrylonitrile, butadiene, and styrene) material, and having a plurality of integrally formed portions extending longitudinally of said member.

More specifically, body member 12 includes a pointed entrant portion 14 having a pointed end 16 and a smooth cylindrically shaped section 18 of constant cross section. Section 18 merges with a tapered collar portion 20 having a minimum diameter substantially equal to the diameter of cylindrically shaped section 18. The diameter of collar portion 20 increases in the direction away from said cylindrically shaped section 18.

Immediately beyond collar portion 20 is a threaded portion 22 of constant cross section. The diameter of threaded portion 22 is substantially equal to the maximum diameter of collar portion 20. Next, there is provided a spherically shaped portion 24 having a diameter greater than the diameter of threaded portion 22. Spherically shaped portion 24 merges with another tapered collar portion 26. The diameter of collar portion 26 increases in the direction away from spherically shaped portion 24, and the maximum diameter of said collar portion is substantially equal to the diameter of said spherically shaped portion.

Immediately beyond collar portion 26 is a tapered threaded portion 28 having a minimum diameter substantially equal to the maximum diameter of collar portion 26. The diameter of tapered threaded portion 28 increases in the direction away from collar portion 26. Threaded portion 28 merges with a relatively short flange portion 30 having a diameter substantially equal to the maximum diameter of tapered threaded portion 28. A fracturable stem portion 32 extends from flange portion 30 and merges with a finger gripping portion 34. The diameter of stem portion 32 is substantially less than the smallest diameter of tapered portion 28. Alternatively, stem portion 32 may be of rectangular or square shaped cross section. The important feature being that stem portion 32 is designed to fracture in response to a predetermined force, as hereinafter described, whereby gripping portion 34 is severed from body member 12 after the puncture in the tire has been sealed.

FIGS. 2 and 3 illustrate the manner of inserting plug 10 into tire casing 36. In many instances, it has been found desirable to be able to insert the plug with the use of only one hand. It is for this reason that the pointed entrant portion 14 is provided with a smooth cylindrically shaped section 18 which facilitates the initial sliding insertion of plug 10 into tire casing 36. The direction of the insertion is represented by the arrow in FIG. 2. In other words, plug 10 may be pushed into the puncture, represented generally by numeral 38, until tapered collar portion 20 rests on the outer thread of the tire. Plug 10 is now in position to support itself in puncture 38 without the need of manual pressure. The construction is such as to eliminate the frustrating problem of controlling one-handed initial threaded insertion of repair plugs having a threaded portion extending all the way ot the tip of the pointed entrant portion.

In order to complete insertion of the plug, one need only take hold of finger gripping portion 34 and proceed to screw plug 10 in place. In this regard, rotation of plug 10 serves to screw threaded portion 22 into puncture 38. Such threaded insertion causes spherically shaped portion 24 and tapered portion 26 to forcibly enter puncture 38 by compressing the resilient wall 40 of the tire casing 36 defining the said puncture. Continued rotation of the plug serves to screw tapered threaded portion 28 into puncture 38. This causes spherically shaped portion 24 to be advanced through tire casing 36 as shown in FIG. 3. Threaded insertion of portion 28 serves to locate tapered collar portion 26 in contact with the inner plies 42 of the tire casing surrounding puncture 38, similar to that of a conical seat, for exerting a compressive force on tire plies 42 to seal the said puncture. Such insertion of tapered portion 28 has the effect of exerting an increasingly compressive force on the material of tire wall 40 to complete the sealing operation.

Spherically shaped portion 24 constitutes retaining means to prevent the inadvertent removal of plug 10 from tire casing 36 after the sealing operation. In this regard, after spherically shaped portion 24 is forced through tire casing 36 the resilient inner plies 42 expand in contacting relation to conical seat 26 which serves to lock said spherically shaped portion within said casing.

Upon completion of the sealing operation, stem portion 32 is designed to fracture in response to a predetermined force. For example, stem portion 32 can fracture in torsion due to the increasingly frictional resistance between tapered threaded portion 28 and tire wall 40 upon continued threaded insertion of plug 10 into the puncture of the tire. Such fracture serves to automatically sever finger gripping portion 34 from the body member 12 of plug 10. Alternatively, stem portion 32 can fracture in response to a predetermined bending force to sever the finger gripping portion 34 from the plug.

Some of the factors to consider in determining the force required to fracture stem portion 32 include, among possibly others, the hardness of the material used in the manufacture of plug 10, the composition of the material used in the manufacture of the tire, and the dimensional characteristics of the plug together with the size of the puncture. These factors may be considered in normal experimentation to arrive at optimum sizes for a family of tire plugs to accommodate punctures of varying sizes.

It is believed that mass production of tire plug 10 is possible through conventional injection molding techniques. Samples for use in testing the plug were made from molds fashioned from stock material using conventional lathe and mill cutting equipment. The overall length of the plug may be 1¾ inches (4.45 cm.) with the integrally formed portions being suitably dimensioned to accommodate puncture holes of varying sizes.

There is thus provided a novel repair plug which is inserted into the puncture of the tire without having to resort to the use of special tools or rubber bonding cement. The sealing procedure is effected by a tapered threaded portion which exerts an increasingly compressive force on the tire wall of the puncture upon threaded insertion of the plug. The structure also provides for the finger gripping portion to be severed from the plug after the puncture has been sealed.

Figure 5:
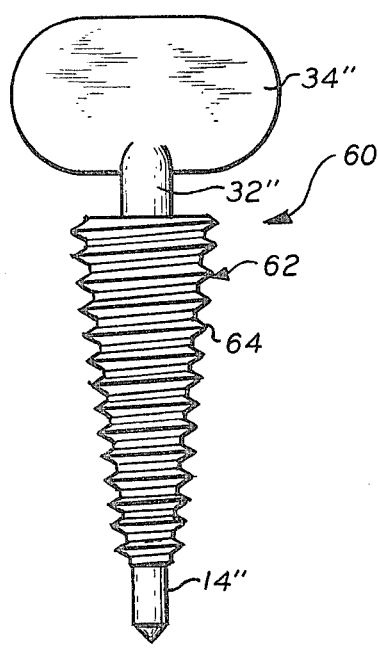
FIGS. 4 and 5 each show additional embodiments of the invention.
Figure 4:
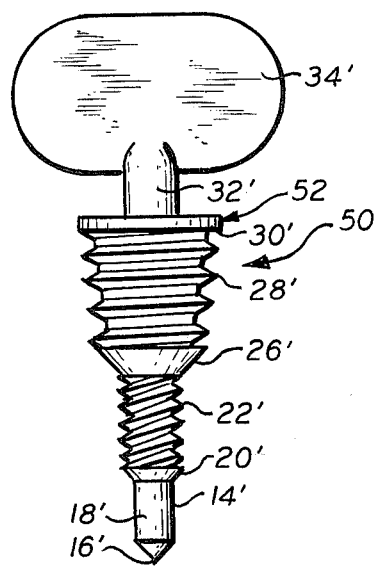

FIGS. 4 and 5 illustrate other embodiments of the invention. The tire plugs of these embodiments are essentially similar to the previously described plug 10 of FIGS. 1-3. Accordingly, those portions of the plugs of FIGS. 4 and 5 that are common to the portions of plug 10 are designated by the same reference numeral, but with the added prime notation. Thus, for example, plug 50 of FIG. 4 comprises a body member 52 having portions 14' through 34' corresponding to the similarly numbered portions of plug 10, with the exception of the spherically shaped portion. In this regard, depending on the size of the puncture, it may not be necessary to provide for retaining means to lock the plug within the tire casing. This is particularly evident where the tire puncture is very small. In view of the obvious similarities between plugs 10 and 50, a more detailed description of plug 50 is not deemed necessary.

The repair plug of FIG. 5 is denoted generally by numeral 60 and includes a body member 62 having substantially fewer integrally formed portions when compared to tire plug 10. Body member 62 includes the comparable pointed body portion 14'', stem portion 32'' and finger gripping portion 34''. However, in place of the portions 20-30 of plug 10, the plug 60 merely provides for a tapered threaded portion 64 extending from pointed entrant portion 14'' to stem portion 32''. The diameter of tapered portion 64 increases in the direction of stem portion 32''. Plug 60 incorporates the salient provisions of the invention; namely a smooth entrant portion, a tapered threaded portion for exerting an increasingly compressive force on the tire wall of the puncture upon threaded insertion of the plug, a fracturable stem portion and a finger gripping portion which is severed from the plug after the puncture has been sealed.

While preferred embodiments of the invention have been shown and described in detail, it will be readily understood and appreciated that various changes or modifications thereof may be made without departing from the spirit and scope of the invention as set forth in the appended claims. For example, the tire casing 36 of FIG. 3 is shown as having two inner plies 42. If the number of plies were increased to four, then the length of conical seat 26 would be increased such as to accomodate the overall height of said plies. Alternatively, the plug could be constructed having still another threaded portion of constant cross section located between conical seat 26 and spherically shaped portion 24. The diameter of this latter threaded portion would be substantially equal to the minimum diameter of conical seat 26. The provision of this latter threaded portion may be of value to facilitate the continued threaded insertion of the plug into a tire casing having a large number of inner plies.

I claim:

1. A tire plug for insertion into the puncture of a tubeless tire, said plug comprising:

(a) a rigid body member having a plurality of integrally formed portions extending longitudinally of said member, said portions comprising:
  (1) a pointed entrant portion located at one end of the body member;
  (2) a severable finger gripping portion located at the opposite end of said member, said finger gripping portion providing the sole leverage for threaded insertion of said plug into the tire without the need of any separate tool;
  (3) a tapered threaded portion located between said entrant portion and said gripping portion; and
  (4) a fracturable stem portion connecting said gripping portion to said tapered portion;
(b) said entrant portion having a smooth surface extending from the pointed end in the direction toward said tapered portion to facilitate initial sliding insertion of said plug into the puncture of said tire to a position to support itself for threaded insertion therein;
(c) the diameter of said tapered threaded portion increasing in the direction toward said gripping portion for exerting an increasingly compressive force on the tire material of the wall defining the puncture to seal said puncture upon threaded insertion of said plug; and
(d) said stem portion fracturing in response to a predetermined force; whereby said gripping portion is severed from said body member after the puncture has been sealed.

2. The tire plug as recited in claim 1, wherein said body member further comprises another threaded portion located between said tapered threaded portion and said entrant portion, said other threaded portion being of constant cross section throughout its length and having a cross sectional dimension less than the corresponding dimension taken throughout the length of said tapered threaded portion, said non-tapered threaded portion being sized to permit threaded insertion of said plug into said tire.

3. The tire plug as recited in claim 2, where in said body member further comprises a tapered collar portion located between said threaded portions, the diameter of said collar portion increasing in the direction toward said tapered threaded portion to define a conical seat, said plug being threadedly inserted into the tire to locate said conical seat in contact with the inner plies of the tire casing surrounding said puncture for exerting a compressive force on said plies to seal said puncture.

4. The tire plug as recited in claim 3, wherein said body member further comprises retaining means to prevent inadvertent removal of said plug from said tire after insertion, said retaining means comprising a spherically shaped portion located between said collar portion and said non-tapered threaded portion, said spherically shaped portion being sized to forcibly pass through the puncture of said tire upon insertion of said plug by compressing the tire wall defining said puncture whereupon the resilient inner plies of the tire casing surrounding said puncture expand to lock said spherically shaped portion within the casing of the tire.

5. The tire plug as recited in claim 1, wherein said stem portion has a cross sectional dimension substantially less than the corresponding dimension taken throughout the length of said tapered threaded portion, and wherein said stem portion fractures when the compressive force between said tapered portion and said tire wall exceeds a predetermined amount to automatically sever said gripping portion from said body member.

6. The tire plug as recited in claim 1, wherein said stem portion has a cross sectional dimension substantially less than the corresponding dimension taken throughout the length of said tapered threaded portion, and wherein said stem portion fractures in response to a predetermined bending force to sever said gripping portion from said body member.

7. The tire plug as recited in claim 1, wherein the smooth section of said body entrant portion is of constant cross section throughout its length.

8. A tire plug for insertion into the puncture of a tubeless tire, said plug comprising:
  (a) a rigid body member having a plurality of integrally formed portions extending longitudinally of said member, said portions comprising:
    (1) a pointed entrant portion located at one end of the body member;
    (2) a severable finger gripping portion located at the opposite end of said member;
    (3) a tapered threaded portion located between said entrant portion and said gripping portion;
    (4) another threaded portion of constant cross section located between said tapered threaded portion and said entrant portion;
    (5) a tapered collar portion located between said threaded portions;
    (6) a spherically shaped portion located between said collar portion and said non-tapered threaded portion; and
    (7) a fracturable stem portion connecting said gripping portion to said tapered threaded portion;
  (b) said entrant portion having a smooth surface of constant cross section extending from the pointed end in the direction toward said non-tapered threaded portion to facilitate initial sliding insertion of said plug into said tire.
  (c) said non-tapered threaded portion having a cross sectional dimension less than the corresponding dimension taken throughout the length of said tapered threaded portion, and being sized to permit threaded insertion of said plug into said tire;
  (d) the diameter of said tapered threaded portion increasing in the direction toward said gripping portion for exerting an increasingly compressive force on the tire material of the wall defining the puncture to seal said puncture upon threaded insertion of said plug;
  (e) the diameter of said collar portion increasing in the direction toward said tapered threaded portion to define a conical seat, said plug being threadedly inserted into the tire to locate said conical seat in contact with the inner plies of the tire casing surrounding said puncture for exerting a compressive force on said plies to seal said puncture;
  (f) said spherically shaped portion being sized to forcibly pass through the puncture of said tire upon insertion of said plug by compressing the tire wall defining said puncture whereupon the resilient inner plies of the tire casing surrounding said puncture expand to lock said spherically shaped portion within the casing of the tire; and
  (g) said stem portion having a cross sectional dimension substantially less than the corresponding dimension taken throughout the length of said tapered threaded portion, and fracturing in response to a predetermined force; whereby said gripping portion is severed from said body member after the puncture has been sealed.

9. The tire plug as recited in claim 8, wherein said stem portion fractures when the compressive force between said tapered thread portion and said tire wall exceeds a predetermined amount to automatically sever said gripping portion from said body member.

10. The tire plug as recited in claim 8, wherein said stem portion fractures in response to a predetermined bending force to sever said gripping portion from said body member.

* * * * *